No. 700,933. Patented May 27, 1902.
H. E. IRWIN.
DOFFER FOR CUTTER GUARDS.
(Application filed Aug. 12, 1901.)
(No Model.)
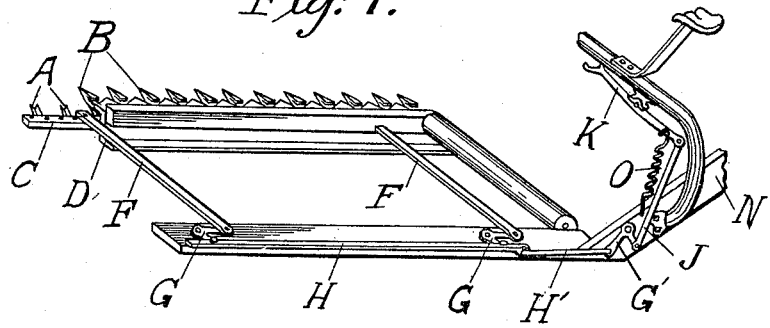
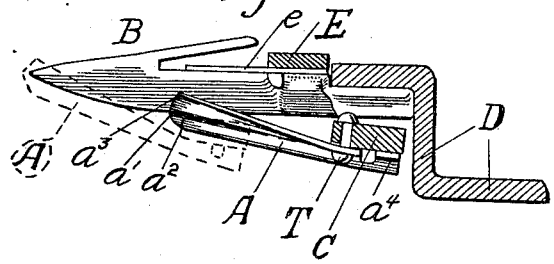
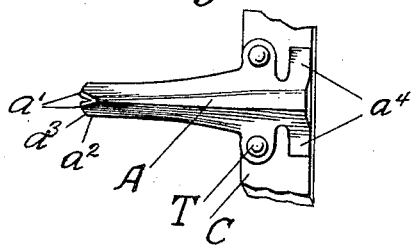
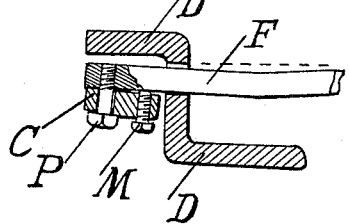
Witnesses.
Isaac C. Preston
Don R Sweney
Inventor.
Herbert E. Irwin

UNITED STATES PATENT OFFICE.

HERBERT E. IRWIN, OF GALESBURG, ILLINOIS.

DOFFER FOR CUTTER-GUARDS.

SPECIFICATION forming part of Letters Patent No. 700,933, dated May 27, 1902.

Application filed August 12, 1901. Serial No. 71,860. (No model.)

*To all whom it may concern:*

Be it known that I, HERBERT E. IRWIN, a citizen of the United States, residing at Galesburg, in the county of Knox and State of Illinois, have invented certain new and useful Improvements in Doffers for Cutter-Guards, of which the following is a specification.

My invention relates to certain new and useful improvements in doffers for cutter-guards, and it is particularly intended and adapted for use on any ordinary grain-harvester; and its primary object is to provide simple and effective means for quickly cleaning the guards on a cutter-bar of harvesting, mowing, reaping, and similar machines.

An object of my invention is to enable the operator of a harvesting, mowing, or similar machine to clean the guards of the cutter-bar and to remove therefrom all cornstalks, tangled weeds, grasses, vines, and other obstructions which have collected about them, causing the operation of the cutting apparatus to be imperfectly performed, without leaving his seat upon the machine, thereby avoiding the danger of leaving unattended horses to go in front of the cutter-bar to remove the accumulations from the guards and knives.

Another object of the invention is to provide a device for harvesting, mowing, or similar machines for quickly and effectively cleaning the guards of the cutter-bar, and by reason of its expedition and efficiency admits of the cutting of the grain or grass very near the surface of the ground, thereby making it possible to harvest the down or leaning grain or grass without the danger of the knives becoming clogged and the guards obstructed by the accumulation of cornstalks, roots, and the like about them and a subsequent loss of time required to loosen up and remove such accumulations and the inconvenience incident thereon.

Another object of this invention is to construct a device for cleaning the guards on a cutter-bar of harvesting, mowing, or similar machines that may require no change in the construction of the present type of machines and which will apply equally to all kinds of guards.

Another object of my invention is to provide means for insuring the contact of the doffers with the guards.

Another object of my invention is to provide a doffer-bar attachment for the cutter-bar of harvesting, mowing, or similar machines whereby when grassy or weedy places are reached the doffer-bar attachment may be caused to project in front of the knives and press down the weeds or grasses not desired to be cut or harvested, and thus prevent them from coming into contact with the knives.

A further object of the invention is to provide a doffer-bar attachment for the cutter-bar of harvesting, mowing, or similar machines whereby when projected in front of the knives the doffer-bar attachment acts as a safeguard to animals from injury with the knives.

My invention is in the nature of an improvement upon that set forth in the patent granted to me November 6, 1900, No. 661,053, and the novelty of my present invention does not reside in a bar located underneath the cutter-guards, but in the combination with such a bar of doffers, together with the novel construction and arrangements of parts.

My invention accomplishes the above-named objects in the manner hereinafter described, and shown in the accompanying drawings, in which—

Figure 1 is a perspective view showing so much of a machine as is necessary to illustrate the manner in which my invention is applied thereto. Fig. 2 is a sectional view showing a doffer and guard in side elevation. Fig. 3 is an elevation showing the under side of a doffer. Fig. 4 is a sectional view of a doffer-bar.

Referring to the drawings, in which like letters of reference denote corresponding parts in all the figures, D designates the harvester-frame, to which are fastened the guards B, in which the cutter-bar E, carrying the knives $e$, operates.

In the drawings I have shown one well-known kind of guard, and, so far as I am aware, my invention is equally adaptable to all kinds with such slight changes and modifications as the particular character of the parts demands.

Doffer A in the preferred construction consists of a plate bent into a double thickness from $a'$ to $a^2$, with the upper faces $a^3$ diverging from the central portion to conform substantially to the lower side of the guard. The front portion of the doffer between $a'$ and $a^2$ slopes to the rear and acts as a sort of runner in order that it may readily pass over any obstacles that may be met in the forward movement of the machine. The rear of the doffer extends into heel $a^4$, which rests against bar C, to which the doffers are fastened by means of rivets T. The doffer-bar C is secured by means of bolt P to the supporting-bar F, which is suitably connected to the foot-treadle K, so that by depressing foot-treadle K the doffer-bar carrying the doffers is projected forward into the position shown by the dotted lines in Fig. 2, and when this pressure is released the doffer-bar is returned to its normal rearward position by means of spring O, which in the embodiment now being described is fastened to the foot-treadle and frame N. This operation may be so quickly performed that the doffer-bar when projected forward will have no perceptible effect upon the cutting of the grain, but, on the contrary, when retained in its forward position will have the desired result of pressing down the grain and preventing it from coming into contact with the knives.

Supporting-bar F passes through the frame D and is connected by a bell-crank G and a rod H, which joins a rod H', one end of which is connected by a bell-crank G' and a rod J to the foot-lever.

The doffers may be provided with hooks for engagement with the doffer-bar; but in the embodiment now being described they are pivotally connected with the doffer-bar by rivets, so that when the attachment is in place the doffers are brought into contact with the under sides of the guards by means of the spring-heels, and also as an additional means for insuring the contact of the doffers with the guards when the doffers are projected forward I bend the supporting-bar F, as shown in Fig. 4, so that when thrust forward the doffer-bar is raised, thus causing the doffers to advance in a direction substantially that in which the under portions of the guards extend.

It may become necessary to adjust the doffer-bar at times, due to the wearing of parts, and for this purpose I provide the doffer-bar with the set-screw M, which operates upon the supporting-bar F to elevate or lower the doffers.

The operation of my improved doffer attachment will be readily understood, it is believed, from the foregoing description.

Under present conditions it frequently happens that cornstalks, roots, and obstructions accumulate about the guards to such an extent that the cutting operation is impaired, and heretofore it has been necessary for the operator of the machine to leave his seat in order to remove such obstructions from around the guards, and frequently there are places which contain grasses and weeds that are undesirable for harvesting purposes, and accidents happen which heretofore may have been unavoidable; but it will be observed that when such conditions occur the operator instead of leaving his seat and removing the obstructions from around the guards with his hands or when grasses or weeds are not desired to be cut or an emergency occurs the operator can easily and quickly depress the foot-treadle K, which operates to throw the doffer-bar C, with the doffers thereon, into the dotted position shown in Fig. 2, thereby cleaning the guards and preventing objects from coming into contact with the knives. The spring O quickly returns the doffer-bar to its normal position, and when in this position it does not interfere with the operation of the machine.

Having thus fully described the invention, what I claim, and desire to secure by Letters Patent, is—

1. In a machine of the character specified, the combination with a cutter-bar and its guard, of an independent doffer slidably connected to said guard, a bar located underneath the guard and supporting said doffer and means for operating said doffer, substantially as and for the purpose set forth.

2. In a machine of the character specified, the combination with a cutter-bar and its guards, of independent doffers slidably connected to each of said guards, a bar located underneath the guards and supporting said doffers, and means for operating said doffers, substantially as and for the purpose set forth.

3. In a machine of the character specified, the combination with a cutter-bar and a series of guards therefor, of doffers located adjacent to said guards, said doffers being provided with spring-heels, a bar supporting said doffers and means for operating said doffers, substantially as and for the purpose set forth.

4. In a machine of the character specified, the combination with a cutter-bar and a series of guards therefor, of doffers located adjacent to said guards, a bar located underneath the guards and supporting said doffers, means for adjusting said bar, and means for operating said doffers, substantially as and for the purpose set forth.

5. In a machine of the character specified, the combination with a cutter-bar, a series of guards for said cutter-bar, and a doffer-bar located underneath the guards carrying doffers adjacent to the guards of the cutter-bar, of means comprising foot-treadle connections, for elevating the doffer-bar, intermediate of said bar and treadle, substantially as and for the purpose set forth.

HERBERT E. IRWIN.

Witnesses:
  E. W. DUNN,
  G. M. JANNISTROM.